(No Model.)

W. F. RICE.
Gate.

No. 243,461. Patented June 28, 1881.

Witnesses:
A. M. Fing,
A. M. Tanner

Inventor.
William F. Rice,
By Paine, Grafton & Sath,
Attorneys.

United States Patent Office.

WILLIAM F. RICE, OF ALPINE, MICHIGAN.

GATE.

SPECIFICATION forming part of Letters Patent No. 243,461, dated June 28, 1881.

Application filed April 25, 1881. (No model.)

*To all whom it may concern:*

Be it known that I, WILLIAM F. RICE, a citizen of the United States, residing at Alpine, in the county of Kent and State of Michigan, have invented certain new and useful Improvements in Gates; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of swinging gates which are capable of being raised to clear snow-banks and other obstructions, and permit poultry and small animals to pass beneath the same.

In all gates of the above class heretofore known the vertical adjustment is effected by lifting or sliding the same on their pintles or axis-rods and fastening the same at different heights thereon.

The object of my invention is to simplify the construction of a swinging and lifting gate and permit the same to be easily and expeditiously raised and lowered and retained at any desired height in relation to the ground and gate-post.

The invention consists in the construction and combination of parts which will be hereinafter described, and then set forth in the claims.

Figure 1:
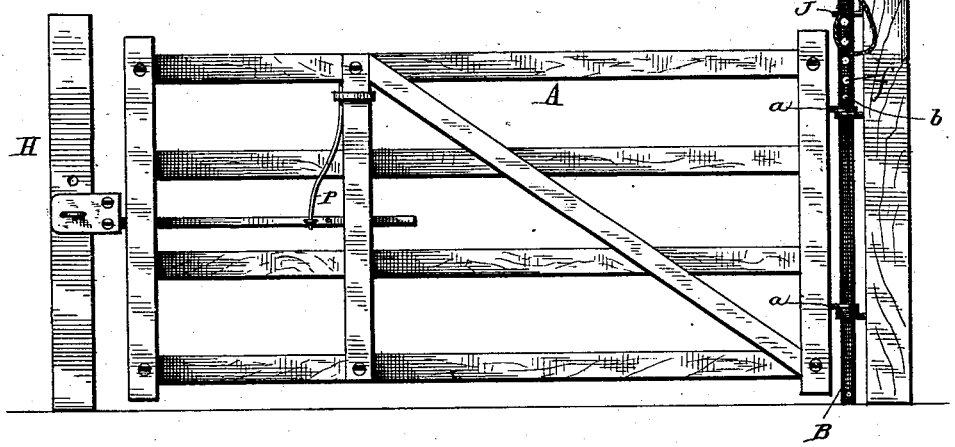
Figure 2:
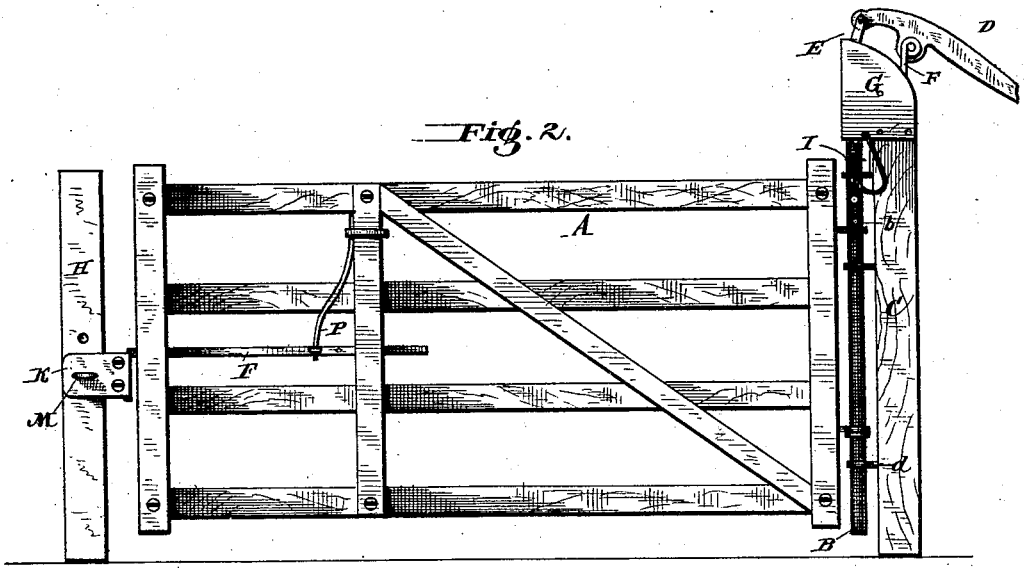
Figure 3:
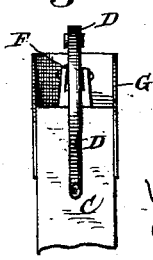

In the drawings, Figure 1 is a side elevation of a swinging and lifting gate in its normal closed position. Fig. 2 is a similar view, showing the gate in a raised position; and Fig. 3 is a detail view, showing the top of the post and cap or hood for protecting the lever of the gate-pintle or axis-rod.

The letter A designates a gate of any preferred form or construction, having the pintle-axis or hinge-rod B connected therewith. In the present instance said pintle or axis-rod passes through eye-plates $a$ carried by the gate, which plates are prevented from moving on the pintle or axis-rod in a vertical direction by suitable stop-pins or projections, $b$, on the latter, but are free to turn thereon for opening and closing the gate. The pintle or axis-rod is fitted in eyes or perforated plates $d$ extending from the gate-post C, and it is free to move up and down in said eyes, together with the gate connected therewith. The upper end of the pintle or axis-rod, on which the gate turns in the manner already stated, is connected with a lever, D, by means of a link, E. The lever is pivoted or fulcrumed in a bracket or angle-plate, F, on the top of the gate-post, and is of a sufficient length and shape to be readily manipulated. A casing or hood, G, extending in an inward direction from the gate-post, serves to inclose or surround the upper end of the pintle, the connecting-link, and the lever, and protect these parts from injury or disturbance by loads of hay or other projecting objects passing through the gate. The casing or hood is constructed of sheet metal, and is attached to the sides of the gate-post.

The gate is provided with a suitable latch or locking device; but I prefer the construction herein shown—viz., a sliding bar, F, on the gate, pressed into a grooved block, K, on the gate-post H, by a vertical spring, P, bearing on said sliding bar F.

The gate can turn on the pintle or hinge-rod in the customary way, and, as already mentioned, said pintle or hinge-rod is fitted in its bearings or eyes so that it can be raised and lowered by means of the lever connected therewith.

Thus it will be evident that the gate can be lifted by depressing the lever for the purpose of raising it above snow-banks or other obstructions and permitting small animals and poultry to pass beneath. The gate, after having been raised, is prevented from dropping down by means of a locking-pin, I, which is passed through one of a series of holes, $f$, made in the pintle or hinge-rod. The locking-pin rests on the upper side of an angle-plate or stop, J, secured to the post.

In order to provide for the proper retention of the gate-latch in the different positions of the gate, I make the grooved retaining-block K adjustable on the gate-post, and secure it by a locking-pin, $m$, passed through ears or metal flanges of said block and holes in the post.

A gate constructed according to my invention is more easily managed than one in which the gate must be raised bodily on its pintle or hinge-rod in order to effect the vertical adjustment thereof. The employment of a lever connected with the pintle and arranged at the top of the post presents every facility for conveniently and quickly raising the gates.

Having thus described my invention, what I claim as new, and desire to secure by Letters Patent, is—

1. The combination of the vertically-movable pintle or axis-pin, and lever connected with the top thereof, with the gate turning on said pintle, and prevented from moving vertically thereon, and gate-post carrying the lever, as and for the purpose set forth.

2. The combination of the perforated and vertically-movable pintle or hinged rod, the lever connected therewith, the gate-post, having a stop-plate, the locking-pin passed through the pintle or hinge-rod, and the gate turning on the latter, as and for the purpose set forth.

In testimony whereof I affix my signature in presence of two witnesses.

WM. F. RICE.

Witnesses:
 VAN E. YOUNG,
 EDWARD B. MOORE.